United States Patent Office 2,754,585
Patented July 17, 1956

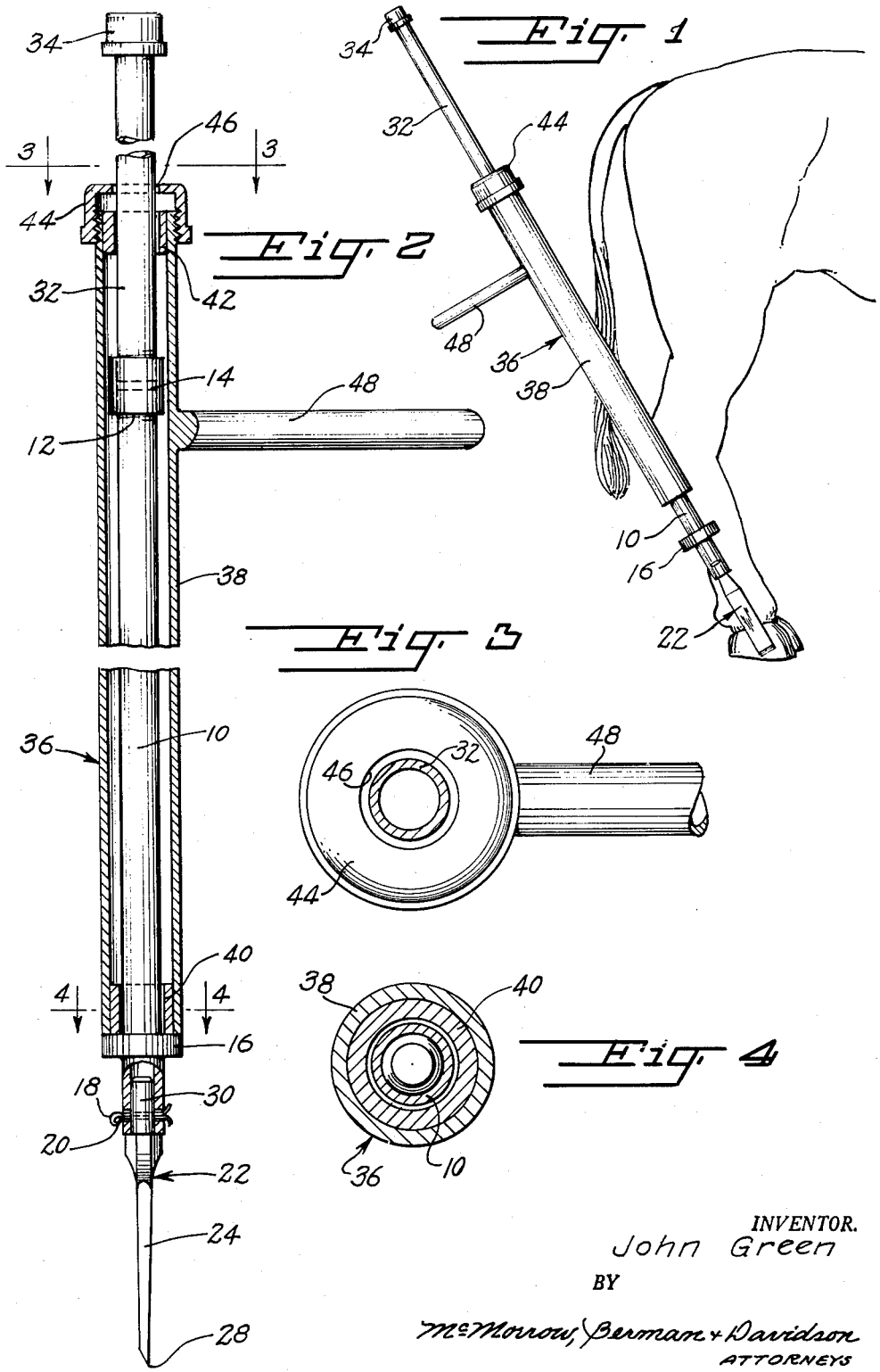

2,754,585

ANIMAL HOOF TRIMMER

John Green, Easton, Md.

Application July 30, 1954, Serial No. 446,766

2 Claims. (Cl. 30—277)

This invention relates to an animal hoof trimmer and has for its primary object to facilitate the trimming of the hoofs of domestic animals such as horses, cows, and the like.

Another object is to facilitate the rapid trimming of the hoofs of an animal with the expenditure of but a minimum amount of effort.

The above and other objects may be attained by employing this invention which embodies among its features an elongated shank, a handle carried by and extending longitudinally from said shank adjacent one end thereof, an annular stop flange carried by the shank and extending outwardly therefrom adjacent the end thereof remote from the handle, a hoof trimming tool carried by the shank and extending longitudinally therefrom adjacent the stop flange, and a hammer encircling said shank and movable longitudinally thereon for repeated impact against the flange to drive the tool against the work.

Other features include coupling the handle to the shank by a separable coupling to facilitate the separating of the handle from the shank for transportation or storage.

In the drawings:

Figure 1 is a side view of a tool embodying the feaures of this invention showing it in use;

Figure 2 is a fragmentary longitudinal sectional view through the tool;

Figure 3 is an enlarged transverse sectional view taken substantially on the line 3—3 of Figure 2; and Figure 4 is an enlarged sectional view taken substantially on the line 4—4 of Figure 2.

Referring to the drawings in detail, the illustrated device comprises a tubular shank 10 provided adjacent one end with external screw threads 12 for cooperation with an internally screw threaded socket 14. Carried by the shank and extending outwardly therefrom adjacent the end thereof remote from the socket 14 is an annular flange 16 defining a stop, the purpose of which will hereinafter appear.

Extending diametrically through the tubular shank 10 between the flange 16 and the adjacent end of said shank is a transverse opening 18 accommodating a suitable cotter pin 20 by means of which a tool designated generally 22 is held in place in the shank 10. The tool above referred to comprises a bit 24 having a chisel edge 28 at one end and carried by the bit 24 adjacent the end thereof remote from the chisel edge 28 is an extension 30 which is received in the end of the shank 10 adjacent stop collar 16 and is provided with an opening which aligns with the opening 18 in the shank 10 and receives the cotter pin which holds the tool 22 in place in the shank. Obviously by extracting the cotter pin 20, another tool of a different character may be coupled to the shank 10 to perform various types of service in the trimming of the hoofs of the animal.

Threadedly engaged with the socket 14 and extending longitudinally therefrom in axial alignment with the shank 10 is a handle 32 which may be threadedly disengaged from the socket 14 to reduce the length of the tool for ease of transportation or storage.

The end of the handle 32 remote from that which enters the coupling 14 is provided with a suitable cap 34 as will be readily understood by reference to the drawings.

Encircling the shank 10 is a hammer designated generally 36 which comprises a tubular body 38 carrying adjacent its end adjacent the stop collar 16 an inwardly extending bushing 40 which serves as a guide for one end of the body 38 during its reciprocation on the shank 10. A similarly extending bushing 42 is carried by the tubular body 38 adjacent the end thereof remote from the flange 16 and encircles the handle 32 when the latter is assembled with the shank 10 to serve as a guide for the hammer 36. A cap 44 is threadedly engaged with the tubular body 38 adjacent the end thereof adjacent the bushing 42 and is provided with an axial opening 46 through which the handle 32 extends when it is threadedly engaged with the socket 14. A bar 48 is secured to the hammer 36 and extends laterally outwardly therefrom adjacent the cap 44.

In use, assuming that the device is in knocked down condition, the handle 32 is introduced into the tubular body 38 through the opening 46 in the cap 44 and threadedly engaged with the socket 14. With a selected tool 22, such as a chisel, mounted in the shank 10, as shown in Figure 2, the tool is guided by the handle 32 against the work and the hammer 36 is reciprocated by grasping the bar 48 and moving it longitudinally relative to the shank 10. Such movement of the hammer will cause it to strike repeated blows on the flange 16 to drive the tool against the work. Obviously, when it is desired to transport or store the trimmer, the handle 32 may be disconnected from the shank 10 and withdrawn from the interior of the handle for reducing the length of the device and enabling it to be easily transported or stored.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a tool of the character described, an elongated tubular hammer having open upper and lower ends, a tubular shank slidably engaged in said hammer, said shank having a lower end located below the lower end of the hammer, said shank having a fixed stop flange below and for engagement by the lower end of the hammer, said stop flange being spaced below the lower end of the hammer, a tool secured to the lower end of the shank, a cap closing the upper end of said hammer, said shank having an upper end spaced downwardly from said cap, a socket fixed on the upper end of the shank and projecting longitudinally from the shank, a handle extending through said cap and having a lower end removably engaged in said socket and a handle extending through said cap and having a lower end removably engaged in said socket and having an upper end projecting above and spaced from said cap.

2. In a tool of the character described, an elongated tubular hammer having a bore and an upper end and a lower end, an upper bushing fixed within the upper end of the hammer, a lower bushing fixed within the lower end of the hammer, said bushings having bores axially aligned with and smaller in diameter than the bore of the hammer, a shank of a diameter smaller than the bore of the hammer and loosely and slidably fitting the bores of the bushings and engaged therethrough, said shank having a lower end spaced below the lower end of the hammer, a fixed annular stop flange on the projecting laterally from said shank at a point spaced above the lower end of the shank and below the lower end of the hammer and with which the lower end of the hammer is engageable, said shank having an upper end normally spaced below said upper bushing, a socket fixed on the upper end of the shank and projecting laterally therefrom for engagement with said upper bushing, a longitudinal handle sliding through said upper bushing and having a lower end removably secured in said socket and an upper end positioned above the upper end of the hammer, and a tool secured to the lower end of the shank.

References Cited in the file of this patent

UNITED STATES PATENTS

| | | |
|---|---|---|
| 14,097 | Harvey | Jan. 15, 1856 |
| 178,627 | Gordon et al. | June 13, 1876 |
| 358,665 | Holden | Mar. 1, 1887 |
| 875,940 | Mason | Jan. 7, 1908 |
| 1,082,379 | West | Dec. 23, 1913 |
| 1,229,732 | Erickson | June 12, 1917 |
| 1,521,265 | Anderson | Dec. 30, 1924 |
| 2,466,845 | Ghee et al. | Apr. 12, 1949 |
| 2,475,041 | Mattson | July 5, 1949 |

FOREIGN PATENTS

| | | |
|---|---|---|
| 859,850 | Germany | Dec. 15, 1952 |
| 896,993 | France | Mar. 8, 1945 |